United States Patent [19]

Jelinek et al.

[11] 4,159,118

[45] Jun. 26, 1979

[54] SEALING DEVICE FOR SCREW THREADS

[75] Inventors: Jerry G. Jelinek, LaHabra; Orville J. Bain, Van Nuys, both of Calif.

[73] Assignee: Parker-Hannifin Corporation, Cleveland, Ohio

[21] Appl. No.: 884,862

[22] Filed: Mar. 9, 1978

[51] Int. Cl.² .............................................. F16J 15/24
[52] U.S. Cl. ...................................... 277/27; 277/71; 277/165
[58] Field of Search ..................... 277/27, 165, 24, 71

[56] References Cited

U.S. PATENT DOCUMENTS

| | | | |
|---|---|---|---|
| 3,116,931 | 1/1964 | Edwards | 277/165 |
| 3,375,014 | 3/1968 | Chubb et al. | 277/27 |
| 3,669,460 | 6/1972 | Wysone | 277/165 |
| 3,869,133 | 5/1975 | Pesendorfer | 277/27 |
| 4,053,167 | 10/1977 | Jelinek | 277/165 |

*Primary Examiner*—Robert I. Smith
*Attorney, Agent, or Firm*—John N. Wolfram

[57] ABSTRACT

A sealing device for sealing between a screw and a nut threaded thereon. The device is particularly suitable for sealing a ball type screw wherein the thread on the screw includes a helical rounded groove and wherein the thread crest is a cylindrical surface. The device is mounted in a recess of the nut and includes an annular elastomeric member having on its inside surface ribs to seal against the screw thread crests and a projection to seal the groove. The radially outer portion of the elastomeric member is generally U shaped with radially extending ribs axially spaced to provide a recess therebetween. The outer tips of the ribs seal against a cylindrical wall of the nut recess but each tip is deflectable out of contact with such wall when the fluid pressure is high on the axially outer surface of that tip to permit the high pressure fluid to enter the recess between the lips to press the other tip into tighter sealing engagement with the nut wall and to press the projection and ribs into tighter sealing engagement with the screw. The lips are backed by rigid washers to permit the deflection and tighter sealing of the lip tips and thus the device is suitable for high pressure.

22 Claims, 10 Drawing Figures

4,159,118

SEALING DEVICE FOR SCREW THREADS

BACKGROUND OF THE INVENTION

U.S. Pat. No. 4,053,167 discloses a sealing device for sealing between a screw and a nut, particularly of the ball screw type. The sealing device shown in the patent is mounted between a screw and nut and has a projection and ribs on its inner surface to seal against the screw thread. It is satisfactory for low fluid pressures such as up to about 500 psi. However, it may not always be satisfactory for high pressures because it utilizes a solid block of elastomeric material that seals against the nut and does not utilize fluid pressure to aid in such sealing.

SUMMARY OF THE INVENTION

The present invention is an improvement over the device shown in the above mentioned patent in that it is suitable for higher pressures, such as at least 500 psi. The improved device includes an elastomeric member that has on its inner surface a projection and helical and axial ribs to seal the groove and crests of the thread of the screw as before, but the radially outer portion of the elastomeric member is provided with lips to seal against a cylindrical wall of the nut. The outer tip of each lip is deflectable out of contact with such wall when the fluid pressure is high on the axially outer surface of that tip to permit the high pressure fluid to enter a recess in the member between the lips where it acts on the other tip to press it into tighter sealing contact with the nut wall and to press the projection and ribs into tighter sealing contact with the screw. The lips are backed up by rigid washers so as to permit axially inward deflection of the adjacent tip and tighter sealing of the other tip to thus permit use of the sealing device for high fluid pressures.

DETAIL DESCRIPTION

Figure 1:
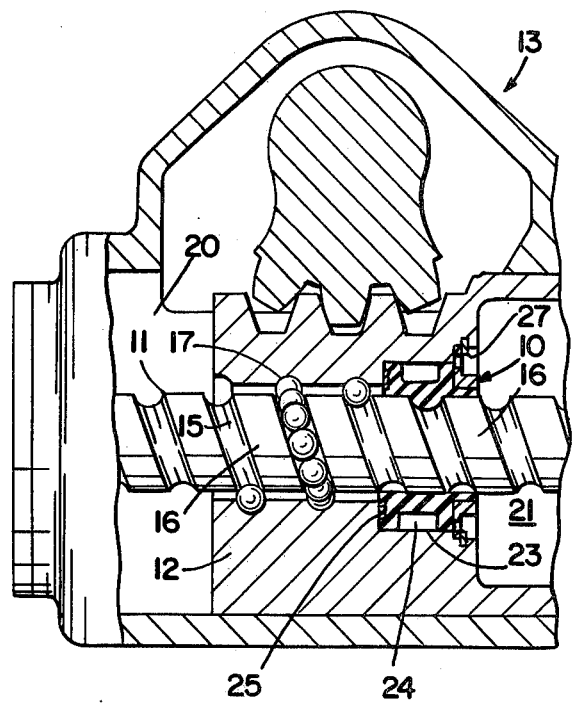
FIG. 1 is a fragmentary section view of a power steering unit in which the sealing device may be utilized.

As shown in FIG. 1, the sealing device 10 may be used, for example, to seal between a ball screw 11 and a nut 12 in a power steering unit 13 wherein screw 11 is mounted for rotational movement but is secured against axial movement while nut 12 is secured against rotational movement but may move axially. Screw 11 has a helically progressing rounded thread groove 15 and a cylindrical helically progressing thread crest 16 next to the groove. Nut 12 has a complementary helically progressing groove 17 and a series of balls 18 are within grooves 15 and 17 to provide threaded engagement between screw 11 and nut 12 in an arrangement commonly referred to as a ball screw. The balls provide very low friction between the screw and nut when one is turned relative to the other.

During operation of the power steering unit on a vehicle, fluid under pressure is in chamber 20 when the vehicle is to turn in one direction and is in chamber 21 when it is to turn in the opposite direction. At such times nut 12 moves axially first to the right and then to the left and screw 11 rotates first in one direction and then in the opposite direction. Sealing device 10 at all times seals between the nut and screw to prevent leakage of pressurized fluid from the one chamber to the other. As shown in FIG. 1, sealing device 10 is mounted in a cylindrical recess 23 of the nut that has a cylindrical base or wall 24 and a bottom wall 25 and is retained therein by a snap ring 27.

Figure 3:
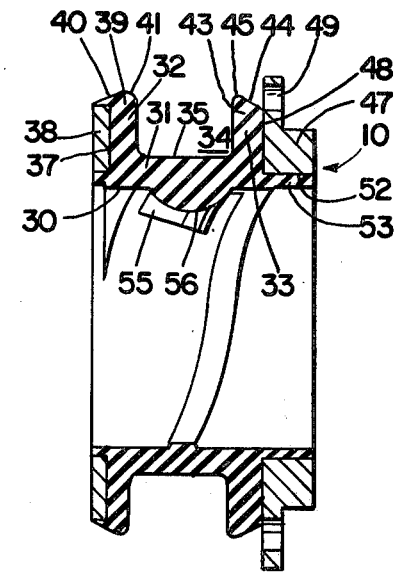
FIG. 3 is a cross-section view of the sealing device along the lines 3—3 of FIG. 2.
Figure 2:
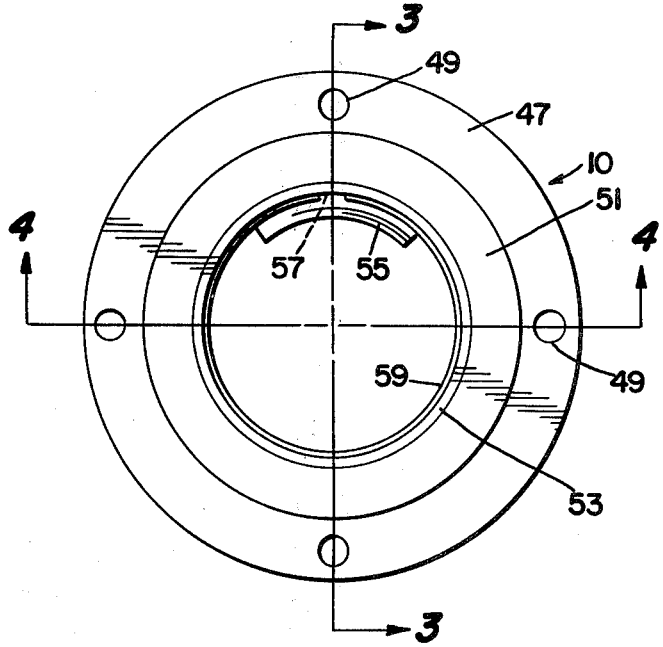
FIG. 2 is an end view of the sealing device.

As shown in FIGS. 2 and 3, sealing device 10 includes an annular ring 30 of elastomeric material that is generally U shaped in radial cross-section and has a base 31 of relatively thin radial thickness and from whose axial ends first and second annular lips 32 and 33 extend radially outward with a recess 34 therebetween that has a bottom surface 35. Lip 32 has a recess 37 in its outer axial end in which a backup washer 38 of metal or other material that is more rigid than ring 30 is retained, preferably by bonding. The radially outer tip 39 of lip 32 is tapered as at 39 on its axially outer side and is rounded as at 40 on its axially inner side. The radially outer tip 43 of lip 33 likewise has a tapered axially outer face 44 and a rounded inner face 45. A combination backup and retainer washer 47 butts against axially outer face 48 of lip 33 and preferably is bonded thereto. Washer 47 has a series of circumferentially spaced holes 49 therethrough axially opposite tip 43 of lip 33 and it has a cylindrical extension 51 whose inner diametral surface 52 contacts the outer surface of an annular extension 53 on elastomeric member 30 and preferably is bonded thereto.

Base portion 31 of elastomeric member 30 has a radially inward projection 55 that has a rounded surface 56 to be received in screw thread groove 15. Initially it is of slightly greater cross-sectional radius than groove 15 so that when inserted therein it will deform somewhat and be in firm sealing engagement with the surface of groove 15. Projection 55 extends helically with the same pitch as groove 15 but only through a circumferential arc of about 75°. Projection 55 is radially opposite recess 34.

At the angular midpoint of projection 55 there is a pair of axially extending ribs 57, 58 that merge with the projection at their axially inner ends and whose outer ends merge with a helical rib 59 that extends for a full turn with a uniform axial width from rib 57 to rib 58 and feathers away at 61 on an opposite side of rib 57 and also at 62 on an opposite side of rib 58. Ribs 57, 58 and 59 are on the same diameter which is initially somewhat smaller than the diameter of screw cylindrical crest 16 so that when the screw 11 is within sealing device 10 these ribs will be deformed into firm sealing engagement with crest 16 on each side of projection 55. Projection 55 and ribs 57, 58, 59 establish a seal against screw 11 in that projection 55 prevents leakage along thread groove 15, rib 59 prevents leakage axially across crests 16 for the full turn of the latter that is located angularly between ribs 57, 58, and the latter ribs prevent spiral leakage along this portion of crest 16. This relation remains even though screw 11 turns within nut 12 and sealing device 10.

When there is no fluid pressure acting on the sealing device 10, as shown in FIG. 3, tips 39 and 43 of lips 32, 33 will be in light sealing contact with recess bore wall 24.

Figure 4:
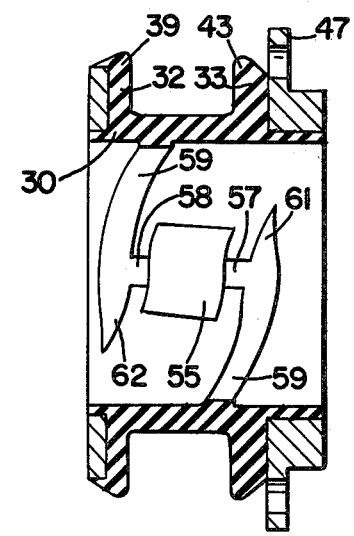
FIG. 4 is a cross-section view of the sealing device along the lines 4—4 of FIG. 2.
Figure 5:
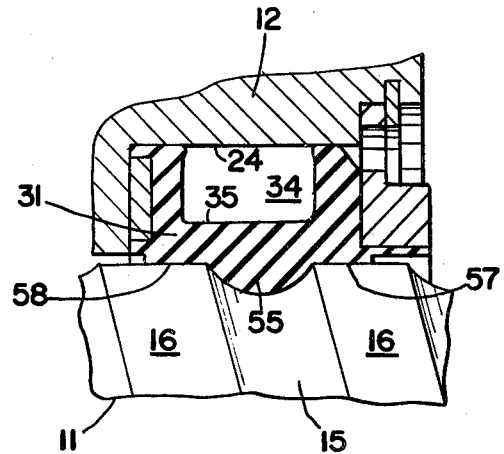
FIG. 5 is a fragmentary cross-section view of the sealing device between a screw and nut before fluid pressure is applied.
Figure 6:
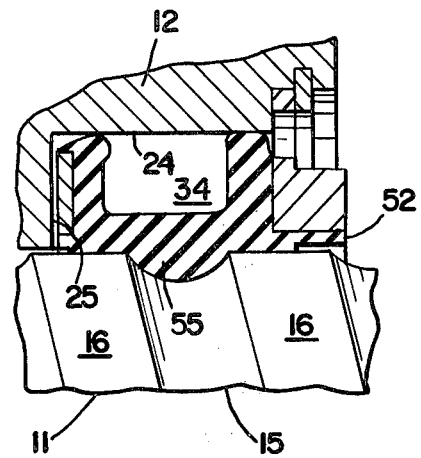
FIG. 6 is a view like FIG. 5 but with fluid pressure applied from one end of the sealing assembly.
Figure 7:
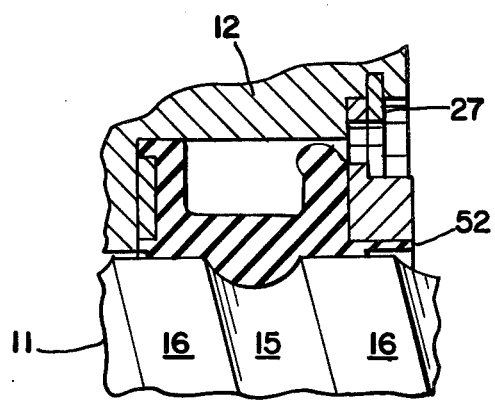
FIG. 7 is a view like FIG. 5 but with fluid pressure applied from the other end of the sealing device.

When a greater fluid pressure exists in chamber 20 than in 21, fluid from chamber 20 will travel along the outer surface of screw 11 within nut 12 until it reaches sealing device 10. Some of the fluid will force its way between washer 38 and nut recess bottom wall 25 and deflect tip 39 of lip 32 axially inwardly and radially downwardly out of contact with recess wall 24, as shown in FIG. 4, and enter recess 34. The pressurized fluid in recess 34 will then press radially inwardly against recess bottom wall 35 to deform base 31 radially inwardly so that projection 55 and ribs 57, 58, 59 will be pressed into tighter sealing contact with screw thread groove 15 and crest 16. This occurs with respect to even those portions of ribs 57, 58 and 59 that are not directly radially beneath recess 34 because of the deformability of the elastomeric material. At the same time, the pressurized fluid with recess 34 will press axially against tip portion 43 of lip 33 but because of the specified shaping of tip portion 43 and the backing up of lip 33 by rigid washer 47, tip 43 will be deformed into tighter engagement with recess wall 24, as shown in FIG. 4, rather than out of engagement therewith.

Conversely, when a higher fluid pressure exists in 21 than in chamber 20, fluid from chamber 21 will pass through holes 49 and deflect tip portion 43 of lip 33 out of contact with recess wall 25 to enter recess 34 and press tip portion 39 of lip 32 into tighter sealing contact with wall 25 and press base 31 radially inwardly so that projection 55 and ribs 57, 58 and 59 more tightly engage screw 11. In such case washer 38 supports lip 32.

Figure 8:
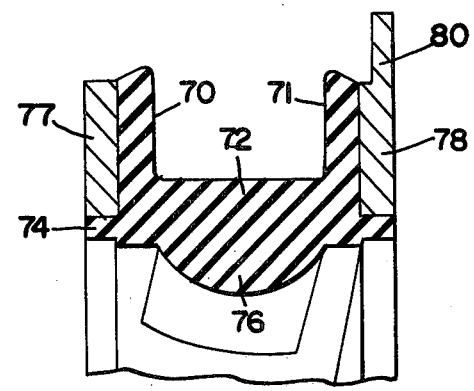
FIG. 8 is a fragmentary cross-section view of a modified form of the invention.
Figure 9:
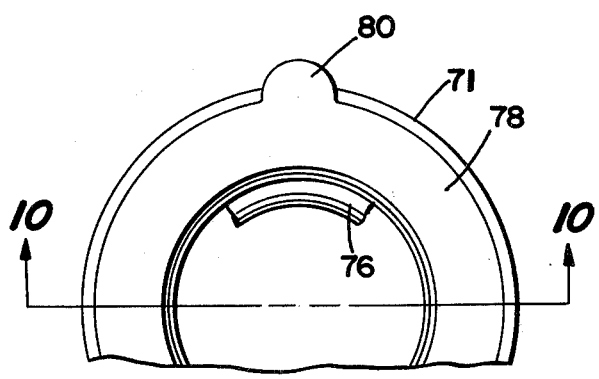
FIG. 9 is a fragmentary end view of FIG. 8.
Figure 10:
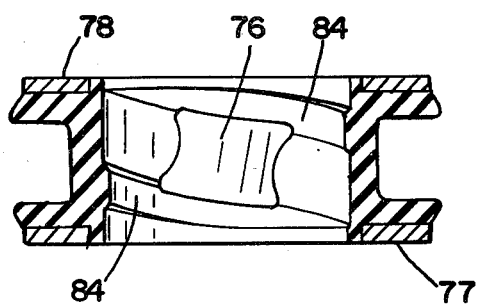
FIG. 10 is a view along 10—10 of FIG. 9.

In the form of the invention shown in FIGS. 8, 9, and 10, the two lips 70, 71 of elastomeric member 72 are of identical thickness and length and are symmetrical about a plane through a midpoint between the lips and normal to the longitudinal axis of member 72. The base 74 of the member 72 is also symmetrical about this plane but of course projection 76 is not symmetrical about this plane because it progresses helically in the same manner as projection 55.

Support members 77, 78 are of equal axial thickness and radial length so as to be identical, except that member 78 may have a radially projecting tab 80 in some cases to fit into a complementary slot 81 in nut 12 to positively prevent relative rotation between the nut and elastomeric member 72, the support members 77, 78 being bonded to such elastomeric member 72.

In this modification there are no ribs corresponding to ribs 57, 58 of FIG. 4. Instead, projection 76 which corresponding to projection 55 of FIG. 4 merges directly with helical rib 84 of FIG. 10 which corresponds to helical rib 59 of FIG. 4.

Although the sealing device 10 has been illustrated for use with ball type screw threads, it may be adapted for other types of threads, such as Acme, V or square threads but with projection 55 and ribs 57, 58 and 59 modified to fit the particular thread form.

I claim:

1. A sealing device for sealing between first and second telescoped parts, said device including an elastomeric member having an annular base with a radially inner surface that includes a helically progressing radially inward projection for sealing against one of said parts, first and second lips extending radially outwardly from said base and axially spaced from each other to form an annular recess therebetween, first and second support members of relatively rigid material, one each being in contact with the axially outer end of a respective one of said lips, each lip having a radially outer tip that is axially inwardly deflectable by fluid acting on the axially outer surface thereof and which is sealingly engageable with the other of said parts when not so deflected.

2. The device of claim 1 in which each tip has a portion that is initially out of contact with the respective support member.

3. The device of claim 1 in which one of said lips has a recess in its axially outer end surface in which the respective support member is received.

4. The device of claim 1 in which the tip of the first lip has a portion that overlies the outer circumferential surface of the first support member.

5. The device of claim 1 in which the tip of each lip is angled on its axially outer face.

6. The device of claim 1 in which said first support member radially overlies and contacts a major portion of the first lip and at least a portion of the base.

7. The device of claim 1 in which said second support member extends radially beyond the second lip and has an opening therethrough axially opposite the second lip.

8. The device of claim 1 in which said second support member radially overlies and contacts a major portion of the second lip and at least a portion of the base.

9. The device of claim 1 in which said lips and base are symmetrical about a plane midway between said lips and normal to the longitudinal axis of the elastomeric member.

10. The device of claim 9 in which the support members are of the same thickness and are symmetrically mounted on the elastomeric member relative to said plane.

11. The device of claim 1 in which one of said support members has a radially extending projection for engagement with said other part to prevent relative rotation between said device and said other part.

12. A sealing device for sealing between a threaded together screw and nut, the device including an elastomeric member having an annular base with first and second lips extending radially outwardly therefrom, said lips being axially spaced to form a recess therebetween, the base having on its radially inner face sealing surfaces for contacting said screw, at least a portion of said sealing surfaces being radially opposite said recess.

13. The device of claim 9 in which said sealing surfaces include a radially inward projection for reception within the groove of the thread on said screw and also include inwardly projecting ribs for contacting the crests of said thread.

14. The device of claim 10 in which said base opposite the recess is of a thickness less than one-half the radial length of the lips so as to be readily deformable radially inwardly by pressure of fluid within said recess.

15. The device of claim 9 in which portions of said sealing surfaces are radially opposite said lips.

16. The device of claim 9 in which there is a member of rigid material adjacent the axially outer end of each lip.

17. The device of claim 9 in which the base has a portion at each end thereof that extends axially beyond said sealing surfaces.

18. The combination, a threaded together screw and nut, said nut having a bore with a cylindrical wall, a sealing device within said bore, said device comprising an elastomeric member having an annular base, sealing surfaces on the inner face of the base sealingly engaged with the thread on the screw, first and second lips on said member extending radially outwardly of the base and axially spaced to form a recess therebetween, the radially outer tip of each lip being engageable with said wall, a rigid support member adjacent the outer axial face of each lip, means providing for passage of fluid past each support member to the axially outer face of each tip, each tip being deflectable away from contact with said wall by fluid acting on said axially outer face thereof to permit fluid to enter said recess, and each tip being pressable into firm sealing engagement with said wall by fluid in said recess when fluid has entered the recess by deflecting the other of said tips.

19. The combination of claim 18 in which said base is of a thickness that it may be deformed by pressure of fluid in said recess to press the sealing surfaces into tighter engagement with the screw.

20. The combination of claim 18 in which one of said support members is within said bore and radially spaced therefrom to provide for said passage of fluid.

21. The combination of claim 18 in which one of said support members extends radially beyond said cylindrical wall and has an opening therethrough that provides for said passage of fluid.

22. The combination of claim 19 in which said recess is radially opposite at least a portion of said sealing surfaces.

* * * * *